US007745056B2

(12) United States Patent
Lee et al.

(10) Patent No.: US 7,745,056 B2
(45) Date of Patent: Jun. 29, 2010

(54) ELECTROLYTE FOR LITHIUM SECONDARY BATTERY COMPRISING CHELATING AGENT AND LITHIUM SECONDARY BATTERY USING THE SAME

(75) Inventors: Jae Hyun Lee, Daejeon (KR); Soon Ho Ahn, Daejeon (KR); Jong Hoa Ok, Daejeon (KR); Seung Tae Hong, Daejeon (KR); Jeong Min Kim, Daejeon (KR); Jong Mo Jung, Daejeon (KR); Hyo Shik Kil, Daejeon (KR); Sung Hyup Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/095,845

(22) PCT Filed: Dec. 1, 2006

(86) PCT No.: PCT/KR2006/005152

§ 371 (c)(1),
(2), (4) Date: Jun. 2, 2008

(87) PCT Pub. No.: WO2007/064170

PCT Pub. Date: Jun. 7, 2007

(65) Prior Publication Data

US 2008/0280211 A1     Nov. 13, 2008

(30) Foreign Application Priority Data

Dec. 2, 2005     (KR)     ...................... 10-2005-0116827

(51) Int. Cl.
H01M 6/18 (2006.01)

(52) U.S. Cl. ...................... 429/307; 429/326; 429/200; 429/344; 252/62.2

(58) Field of Classification Search ................. 429/326, 429/200, 344, 307; 252/62.2
See application file for complete search history.

(56) References Cited

U.S. PATENT DOCUMENTS 4,670,363 A     6/1987   Whitney et al.

(Continued)

FOREIGN PATENT DOCUMENTS

JP     2004063123     2/2004

(Continued)

OTHER PUBLICATIONS

Written Opinion for PCT/KR2006/005152 dated Feb. 27, 2007.

(Continued)

*Primary Examiner*—Laura S Weiner
(74) *Attorney, Agent, or Firm*—Cantor Colburn LLP

(57) ABSTRACT

Disclosed herein is an electrolyte for lithium secondary batteries comprising: a chelating agent, which forms complexes with transition metal ions in the battery, and at the same time does not react and coordinate with lithium ions; a non-aqueous solvent; and an electrolyte salt, as well as a lithium secondary battery comprising the electrolyte. The chelating agent, which is contained in the electrolyte for lithium secondary batteries, can suppress a side reaction in which transition metal ions are reduced and deposited as transition metals on the anode. Also, the chelating agent can suppress internal short-circuits in the battery and the resulting voltage drop of the battery and a reduction in the safety and performance of the battery, which can occur when transition metals are deposited on the anode.

4 Claims, 3 Drawing Sheets

U.S. PATENT DOCUMENTS

| | | |
|---|---|---|
| 6,485,868 B1 | 11/2002 | Tsujioka et al. |
| 6,576,373 B1 | 6/2003 | Iwamoto et al. |
| 2006/0194118 A1 | 8/2006 | Yew et al. |

FOREIGN PATENT DOCUMENTS

| | | |
|---|---|---|
| JP | 2005-259635 | 9/2005 |

OTHER PUBLICATIONS

International Search Report for PCT/KR2006/005152 dated Feb. 27, 2007.

Korean Office Action dated Jul. 7, 2008 corresponding to Korean Patent Application No. 10-2005-0116827.

Candian Office Action dated Dec. 11, 2009.

ELECTROLYTE FOR LITHIUM SECONDARY BATTERY COMPRISING CHELATING AGENT AND LITHIUM SECONDARY BATTERY USING THE SAME

BACKGROUND OF THE INVENTION (a) Field of the Invention

The present invention relates to an electrolyte for lithium secondary batteries containing a chelating agent, and a lithium secondary battery comprising said electrolyte.

(b) Description of the Related Art

Recently, the compact and lightweight construction of electronic equipment has been realized and the use of portable electronic devices has been generalized, and thus studies on secondary batteries having high energy density have been actively conducted.

Lithium secondary batteries, which are currently mainly used, comprise cathode and anode made of materials capable of intercalating and deintercalating lithium ions, are fabricated by injecting a non-aqueous electrolyte between the cathode and anode, and produce electrical energy by oxidation and reduction reactions, which occur when lithium ions are intercalated into and deintercalated from the cathode and anode.

When the secondary battery is charged and discharged, transition metal ions in the battery can cause side reactions and can result in a reduction in the performance of the battery. For example, when the cathode contains Fe impurities, Fe can be ionized, and deposited on the anode, resulting in voltage drop. Also, some Co, which is used as the cathode active material, can be dissolved out and deposited on the anode, and when spinel Mn is used for the cathode, Mn can be dissolved. In addition, when a Fe olivine material is used, Fe can be dissolved out. Such side reactions deteriorate the stability and performance of the battery.

In a prior attempt to suppress side reactions, an expensive apparatus for purifying raw materials is used, the pretreatment of raw materials is performed, or other alternative materials having poor performance are used. However, such methods have problems in that they are expensive and deteriorate the performance of the battery.

SUMMARY OF THE INVENTION

It is an object of the present invention to provide an electrolyte for lithium secondary batteries containing a chelating agent, which forms complexes with transition metal ions and, at the same time, does not react and coordinate with lithium ions, and thus can improve the performance and safety of the battery by suppressing side reactions, in which some transition metals and transition metal ions such as Fe impurities, contained in a cathode, are oxidized and deposited on an anode when the battery is charged and discharged, as well as a lithium secondary battery comprising said electrolyte.

To achieve the above object, the present invention provides an electrolyte for lithium secondary batteries, comprising: a chelating agent, which forms complexes with transition metal ions in the battery and, at the same time, does not react and coordinate with lithium ions; a non-aqueous solvent; and an electrolyte salt, as well as a lithium secondary battery comprising said electrolyte.

DETAILED DESCRIPTION OF THE INVENTION

Figure 1:
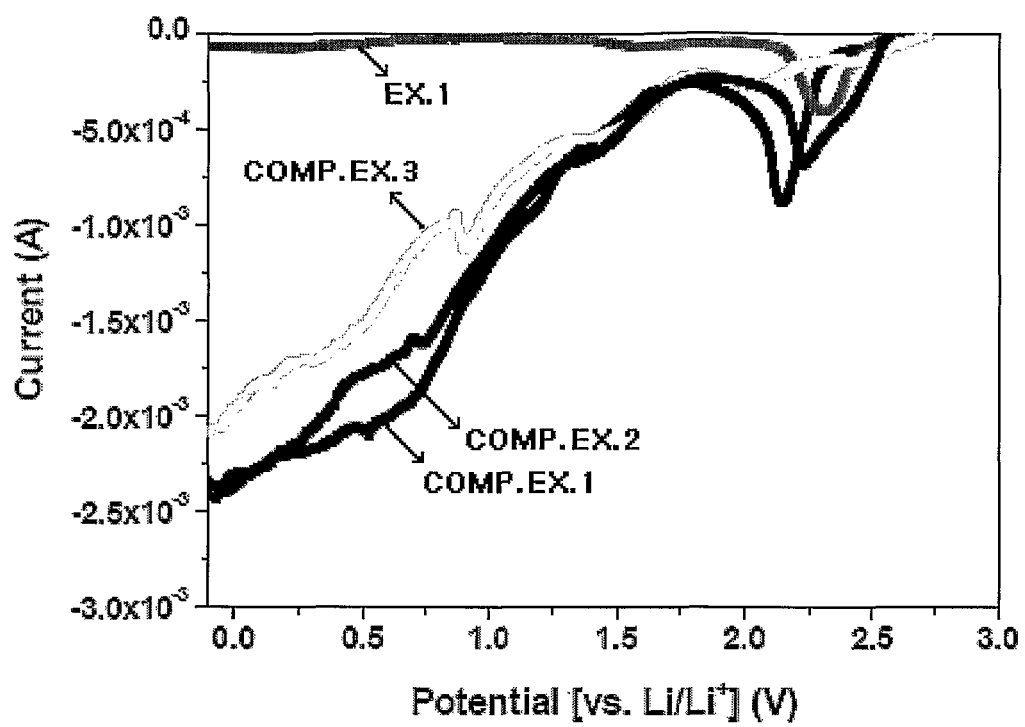
FIG. 1 is a graphic diagram showing the results of Fe electroplating experiments for batteries fabricated according to Example 1 of the present invention and Comparative Examples 1~3.

Hereinafter, the present invention will be described in further detail.

The present invention is characterized in that a chelating agent, which is not reactive with lithium ions and does not form coordinate bonds with lithium ions and thus does not form complexes with lithium ions, is selected and the selected chelating agent is used in a lithium secondary battery.

The cathode of the lithium secondary battery generally contains lithium transition-metal oxides and, in some cases, Fe as an impurity. When this secondary battery is charged and discharged, side reactions can occur, in which transition metals such as Co, Mn and Ni, which can be contained in the cathode, or transition metals such as Fe impurities, are ionized, dissolved out from the cathode, and deposited on the anode.

When the electrolyte of the lithium secondary battery contains a chelating agent, the chelating agent will form coordinate bonds with the metal ions such as Co, Mn, Ni and Fe to form metal-containing cyclic complexes known as chelates. Also, the chelating agent, which is included in the inventive electrolyte, does not deteriorate the performance of the battery because it does not react and coordinate with lithium ions, so that it does not form complexes with lithium ions.

Thus, because the chelating agent forms complexes with transition metal ions except for lithium ions in the battery, it significantly reduces the reactivity of the transition metal ions, so that it can suppress side reactions in which the transition metal ions are reduced and deposited as transition metals on the anode. Also, the chelating agent can suppress internal short-circuits in the battery and the resulting voltage drop of the battery and a reduction in the safety and performance of the battery, which can occur when transition metals are deposited on the anode.

Also, in the present invention, complexes formed between the chelating agent and the transition metal ions are preferably insoluble in the electrolyte. When the complexes between the chelating agent and the transition metal ions are well soluble in the electrolyte, the complexes can migrate to the anode and can be reduced and deposited as transition metals on the surface of the anode.

The chelating agent, which is contained in the inventive electrolyte for lithium secondary batteries, can be at least one selected from the group consisting of EDTA (ethylene diamine tetraacetic acid), NTA (nitrilotriacetic acid), DCTA (trans-1,2-diaminocyclohexanetetraacetic acid), DTPA (diethylene-triaminepentaacetic acid), and EGTA (ethylene glycol bis(2-aminoethyl ether)-N,N,N',N'-tetraacetic acid).

The chelating agent can be contained in an amount of 2 to 200 mM relative to the electrolyte. If the chelating agent is contained in the electrolyte in an amount of less than 2 mM, it will be insignificant with respect to the effects of forming complexes by coordinate bonds between the chelating agent and the transition metal ions and suppressing the side reaction in which transition metals are deposited in the anode. On the other hand, if the chelating agent is contained in an amount of more than 200 mM, it will not have any further effect resulting from an increase in the amount of use of the chelating agent.

The non-aqueous solvent, which is contained in the inventive electrolyte for lithium secondary batteries, is not specifically limited as long as it is generally used as a non-aqueous solvent for non-aqueous electrolytes. Examples of the non-aqueous solvent, which can be used in the present invention, include cyclic carbonate, linear carbonate, lactone, ether, ester, and ketone.

Examples of the cyclic carbonate include ethylene carbonate (EC), propylene carbonate (PC), and butylene carbonate (BC), and examples of the linear carbonate include diethyl carbonate (DEC), dimethyl carbonate (DMC), dipropyl carbonate (DPC), ethyl methyl carbonate (EMC), and methyl propyl carbonate (MPC). Examples of the lactone include gamma-butyrolactone (GBL), and examples of the ether include dibutyl ether, tetrahydrofuran, 2-methyl tetrahydrofuran, 1,4-dioxane, and 1,2-dimethoxyethane. Also, examples of the ester include methyl acetate, ethyl acetate, methyl propionate, and methyl pivalate, and examples of the ketone include polymethylvinyl ketone. These non-aqueous solvents can be used alone or in a mixture of two or more thereof.

The electrolyte salt, which is contained in the inventive electrolyte for lithium secondary batteries, is not specifically limited as long as it is generally used as an electrolyte salt for non-aqueous electrolytes. Non-limiting examples of the electrolyte salt include salts having a structure such as $A^+B^-$, wherein $A^+$ represents an alkali metal cation such as $Li^+$, $Na^+$, $K^+$, or a combination thereof, and B represents an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or a combination thereof. Particularly, a lithium salt is preferred. These electrolyte salts can be used alone or in a mixture of two or more thereof.

The lithium secondary battery according to the present invention can employ said electrolyte for lithium secondary batteries. Specifically, the lithium secondary battery according to the present invention can comprise a cathode; an anode; a separator; and said electrolyte for lithium secondary batteries.

The lithium secondary battery of the present invention can be fabricated according to a conventional method known in the art by interposing a porous separator between the cathode and the anode, and placing said electrolyte into the resulting structure. However, the method of fabricating the lithium secondary battery, which can be used in the present invention, is not limited to any particular method.

The cathode active material, which is used in the secondary battery of the present invention, can consist of any one or a mixture of two or more selected from among a variety of lithium transition-metal composite oxides (e.g., lithium manganese composite oxide, lithium nickel oxide, lithium cobalt oxide, and the foregoing oxides wherein part of manganese, nickel and cobalt is replaced with other transition metals and the like such as $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-Y}CO_YO_2$, $LiCo_{1-Y}Mn_YO_2$, $LiNi_{1-Y}Mn_YO_2$ ($0<Y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<Z<2$), $LiCoPO_4$ or $LiFePO_4$, or a lithium-containing vanadium oxide and the like), and chalcogen compounds (such as manganese dioxide, titanium disulfide, molybdenum disulfide and the like).

The anode active material, which can be used in the present invention, can consist of a carbon material, a lithium metal or an alloy thereof, which can absorb and release lithium ions. In addition, it is possible to use a metal oxide such as $TiO_2$ or $SnO_2$, which can absorb and release lithium ions and has a potential of less than 2 V for lithium. Particularly, a carbon material such as graphite is preferred.

Although the porous separator, which can be used in the present invention, is not limited to any particular separator, a porous separator can be used, examples of which include polypropylene-based, polyethylene-based, and polyolefin-based porous separators.

In addition, although the shape of the lithium secondary battery is not limited to any particular shape, it can have a cylindrical shape, a prismatic shape, a pouch shape or a coin shape.

Hereinafter, the present invention will be described in further detail with reference to examples. It is to be understood, however, that these examples are illustrative only, and the scope of the present invention is not limited thereto.

EXAMPLE 1

Preparation of Electrolyte and Battery, Containing EDTA as Chelating Agent

An electrolyte was prepared by dissolving $LiPF_6$ in ethylene carbonate (EC): ethyl methyl carbonate (EMC)=1:2(v/v) to a concentration of 1 M, and then adding each of Fe ions ($FeCl_3$) and EDTA as a chelating agent to a concentration of 50 mM.

A battery was fabricated by using a nitric acid-treated silver wire as a reference electrode, a Pt wire as a counter electrode, a copper foil as a working electrode, and the above-prepared electrolyte as an electrolyte.

COMPARATIVE EXAMPLE 1

Preparation of Electrolyte and Battery Containing No Chelating Agent

An electrolyte and a battery were prepared according to the same method as Example 1, except that the chelating agent (EDTA) was not added.

COMPARATIVE EXAMPLE 2

Preparation of Electrolyte and Battery Containing 18-crown-6 as Chelating Agent

An electrolyte and a battery were prepared according to the same method as Example 1, except that 18-crown-6 (crown ether) was used instead of EDTA as a chelating agent.

COMPARATIVE EXAMPLE 3

Preparation of Electrolyte and Battery Containing Dibenzo-18-Crown-6 as Chelating Agent An electrolyte and a battery were prepared according to the same method as Example 1, except that dibenzo-18-crown-6 (crown ether) was used instead of EDTA as a chelating agent.

Experiment 1: Test of Fe electroplating (reduction of Fe ions)

In order to observe reactions in which Fe ions in the electrolytes of batteries prepared in Example 1 and Comparative Examples 1~3 are reduced on the surface of the anode, electroplating experiments were carried out, and the experimental results are shown in FIG. 1.

As can be seen in FIG. 1, in the case where crown ether was used as the chelating agent, Fe ions reacted well with the crown ether to form complexes, but it seems that the complexes were dissolved well in the electrolyte due to the property of the crown ether soluble in the organic solvent, so that they rather helped the Fe ions migrate to the anode and were reduced on the surface of the anode. As a result, this case was not different from the case where the chelating agent was not used. However, in the case where EDTA was used as the chelating agent, a reaction of less than 2V with respect to $Li/Li^+$ ions did not substantially appear, suggesting that the EDTA effectively suppressed the reduction of Fe ions.

EXAMPLES 2~5

Preparation of Electrolytes and Batteries Containing EDTA

Electrolytes and batteries were prepared according to the same method as Example 1, except that EDTA was added in amounts of 2 mM, 5 mM, 10 mM and 200 mM, respectively.

Experiment 2: Reduction of Fe ions at varying EDTA concentrations

Figure 2:
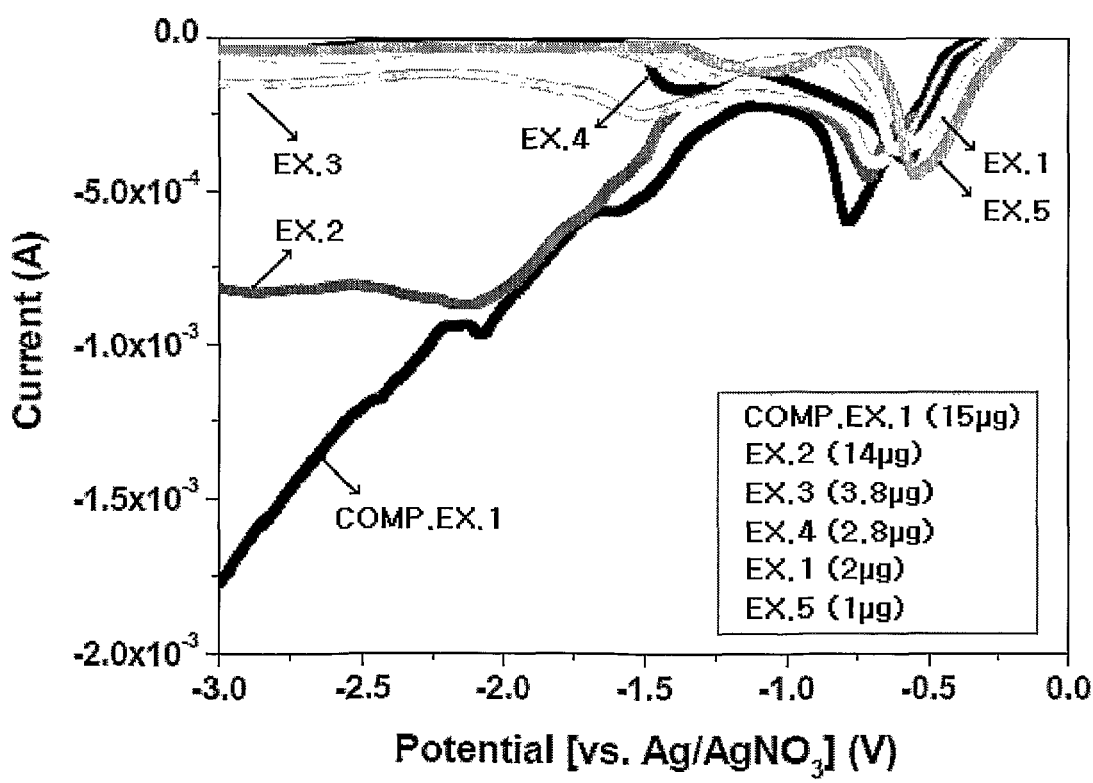
FIG. 2 is a graphic diagram showing the results of Fe electroplating experiments for batteries fabricated according to Examples 1~5 of the present invention and Comparative Example 1.

The reduction reactions of the batteries fabricated in Examples 1~5 and Comparative Example 1 on the surface of a copper foil and the amount of the resulting Fe electroplating were measured, and the measurement results are shown in FIG. 2.

After Fe was electroplated while changing the amount of EDTA, the amount of Fe on the copper foil was analyzed using ICP. As a result, it could be seen that an increase in the amount of EDTA led to a decrease in the amount of the plated Fe. The values in brackets in FIG. 2 are the analyzed amounts of Fe, and it could be seen that, even though the amount of EDTA in the electrolytes was as low as ten times the amount of Fe ions, EDTA was significantly effective in inhibiting the reduction of Fe ions.

EXAMPLE 6

Preparation of Electrolyte and Polymer Battery Containing EDTA

An electrolyte was prepared by adding EDTA to an electrolyte (EC/EMC=½(v/v), 1 M $LiPF_6$) for use in cylindrical batteries to a concentration of 2 mM.

A cathode slurry was prepared by mixing together 90 wt % of $LiCoO_2$ as a cathode active material, 5 wt % of acetylene black as a conductive agent, and 5 wt % of PVDF as a binder, and then adding the mixture to NMP (N-methyl-2-pyrrolidone). Then, the cathode slurry was applied on an aluminum (Al) current collector and dried, thus preparing a cathode.

An anode slurry was prepared by adding a mixture of 95 wt % of graphite as an anode active material and 5 wt % of PVDF as a binder to NMP. Then, the anode slurry was applied on a copper (Cu) current collector and dried, thus preparing an anode.

A polyolefin-based separator was interposed between the prepared cathode and anode, and then the electrolyte was injected into the resulting structure, thus fabricating an ICP563443 polymer battery (5.6 mm thick, 34 mm wide and 43 mm long) having a nominal capacity of 900 mAh.

EXAMPLE 7

Preparation of Electrolyte and Polymer Battery Containing EDTA

An electrolyte and a polymer battery were prepared according to the same method as Example 6, except that EDTA was added to a concentration of 10 mM in the preparation of the electrolyte.

COMPARATIVE EXAMPLE 4

Preparation of Electrolyte and Polymer Battery Containing No EDTA

An electrolyte and a polymer battery were prepared according to Example 6, except that EDTA was not added in the preparation of the electrolyte.

Figure 3:
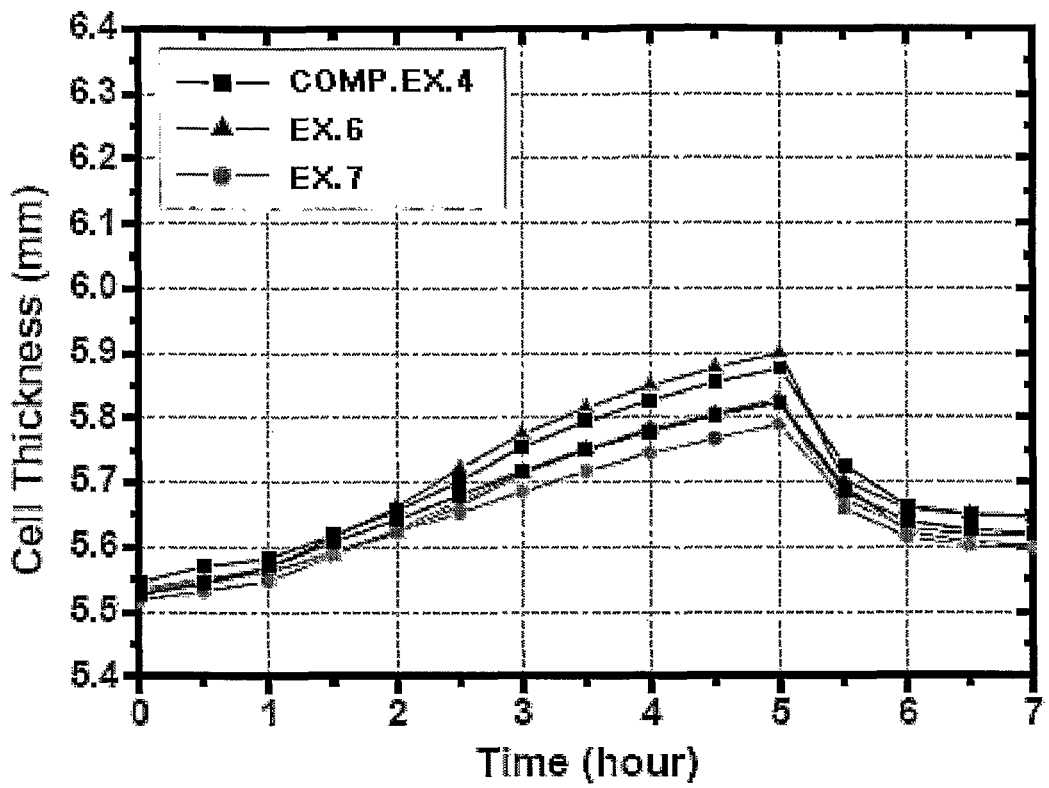
FIG. 3 is a graphic diagram showing the high-temperature storage characteristics of batteries fabricated according to Examples 6 and 7 of the present invention and Comparative Example 4.

Experiment 3: Evaluation of high-temperature storage characteristics of battery Each of the batteries fabricated in Examples 6 and 7 and Comparative Example 4 was fully charged to 4.2 V, and placed in a constant-temperature chamber, in which the batteries were heated to 90° C. over one hour, maintained at 90° C. for 4 hours, cooled over one hour, and then maintained at room temperature. During this process, a change in the thickness of each of the batteries was measured, and the measurement results are shown in FIG. 3.

The thickness of a battery during high-temperature generally becomes thicker due to the generation of gas resulting from the reaction of the electrolyte or the electrolyte additives on the electrode surface. However, an increase in the generation of gas, caused by the use of EDTA, could not be seen in the results of this Experiment. In other words, it could be found that the batteries containing EDTA and the battery containing no EDTA showed similar changes in the thickness thereof, and thus deterioration in the storage characteristics of the batteries caused by the use of EDTA, did not occur.

Experiment 4: Evaluation of C-rate characteristics of batteries

Figure 4:
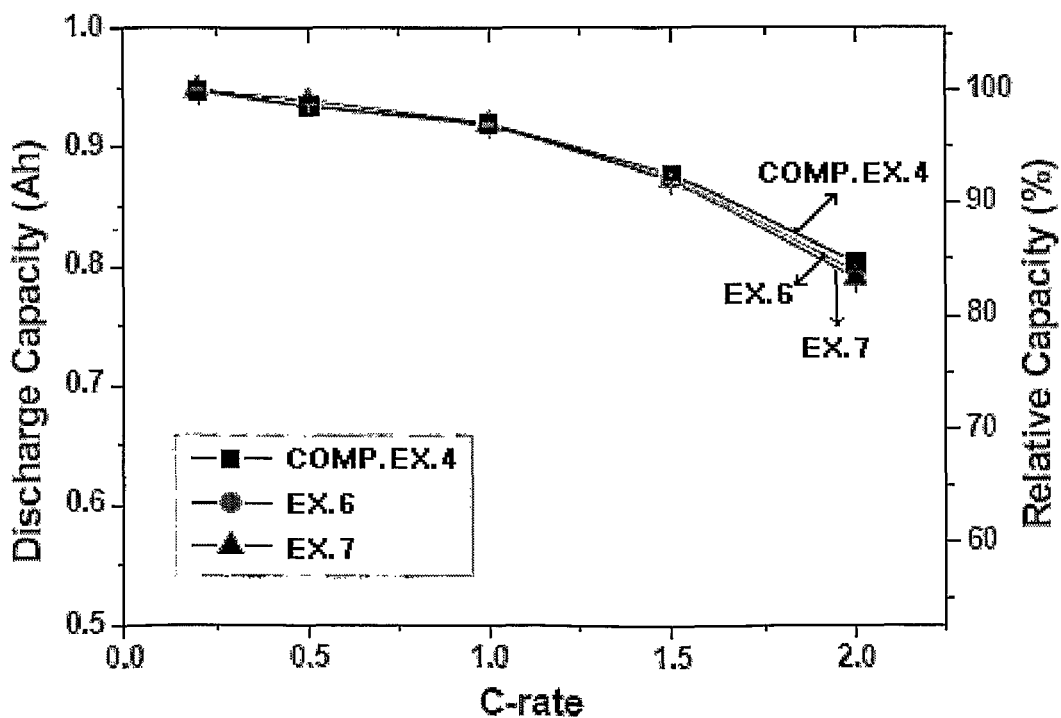
FIG. 4 is a graphic diagram showing the C-rate characteristics of batteries fabricated according to Examples 6 and 7 of the present invention and Comparative Example 4.

The rate capabilities of the batteries fabricated in Examples 6 and 7 and Comparative Example 4 were measured at a charge condition of 0.5 C and varying discharge currents, and the measurement results are shown in FIG. 4.

In the case where EDTA was added, some deterioration in the performance of the batteries occurred at a high rate of 2 C, but was insignificant, and also had little variation between the batteries.

Experiment 5: Evaluation of cycle characteristics of batteries

Figure 5:
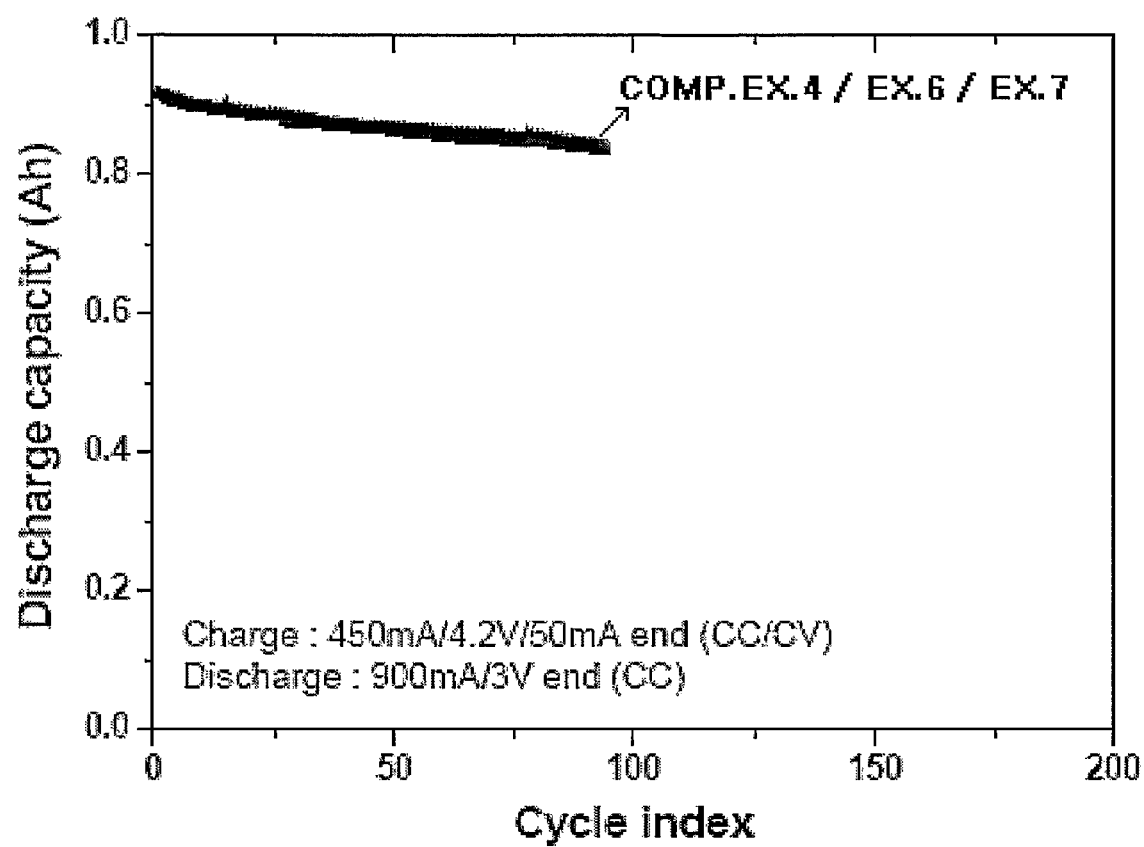
FIG. 5 is a graphic diagram showing the cycle characteristics of batteries fabricated according to Examples 6 and 7 of the present invention and Comparative Example 4.

The cycle characteristics of the batteries fabricated in Examples 6 and 7 and Comparative Example 4 were tested, and the experimental results are shown in FIG. 5.

As can be seen in FIG. 5, the batteries showed substantially the same behavior regardless of the amount of EDTA in 0.5 C charge/1 C discharge conditions and also showed good cycle characteristics.

INDUSTRIAL APPLICABILITY

As can be seen from the foregoing, the chelating agent, which is contained in the inventive electrolyte for lithium secondary batteries, forms complexes with transition metal ions in the battery and, at the same time, does not react and coordinate with lithium ions, and thus can suppress a side reaction in which transition metal ions are reduced and deposited as transition metals on the anode. Also, the chelating agent can suppress internal short-circuits in the battery and the resulting voltage drop of the battery, and a reduction in the safety and performance of the battery, which can occur when transition metals are deposited on the anode.

Although the preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An electrolyte for lithium secondary batteries comprising: a chelating agent, which forms complexes with transition metal ions in the battery, and at the same time does not react and coordinate with lithium ions; a non-aqueous solvent; and an electrolyte salt, wherein the chelating agent is at least one selected from the group consisting of NTA (nitrilotriacetic acid), DCTA (trans-1,2-diaminocyclohexanetetraacetic acid), DTPA (diethylene-triamine pentaacetic acid), and EGTA (ethylene glycol bis(2-aminoethyl ether)-N,N,N',N'-tetraacetic acid), wherein the chelating agent is contained in an amount of 2 to 200 mM relative to the electrolyte.

2. The electrolyte of claim 1, wherein the complexes are insoluble in the electrolyte.

3. A lithium secondary battery comprising an electrolyte for lithium secondary batteries, wherein the electrolyte comprises: a chelating agent, which forms complexes with transition metal ions in the battery, and at the same time does not react and coordinate with lithium ions; a non-aqueous solvent; and an electrolyte salt, wherein the chelating agent is at least one selected from the group consisting of NTA (nitrilotriacetic acid), DCTA (trans-1,2-diaminocyclohexanetetraacetic acid), DTPA (diethylene-triamine pentaacetic acid), and EGTA (ethylene glycol bis(2-aminoethyl ether)-N,N,N',N'-tetraacetic acid), wherein the chelating agent is contained in an amount of 2 to 200 mM relative to the electrolyte.

4. The lithium secondary battery of claim 3, wherein the complexes are insoluble in the electrolyte.

* * * * *